United States Patent
Xu et al.

(10) Patent No.: US 9,212,950 B2
(45) Date of Patent: Dec. 15, 2015

(54) MICROBOLOMETER FOR INFRARED DETECTOR OR TERAHERTZ DETECTOR AND METHOD FOR MANUFACTURING THE SAME

(75) Inventors: Xiangdong Xu, Chengdu (CN); Yadong Jiang, Chengdu (CN)

(73) Assignee: University of Electronic Science and Technology of China, Chengdu, Sichuan Province (CN)

( * ) Notice: Subject to any disclaimer, the term of this patent is extended or adjusted under 35 U.S.C. 154(b) by 1076 days.

(21) Appl. No.: 13/168,467

(22) Filed: Jun. 24, 2011

(65) Prior Publication Data

US 2011/0315981 A1    Dec. 29, 2011

(30) Foreign Application Priority Data

Jun. 24, 2010 (CN) .......................... 2010 1 0208522

(51) Int. Cl.
*G01J 5/02* (2006.01)
*G01J 5/20* (2006.01)
*G01J 5/04* (2006.01)

(52) U.S. Cl.
CPC .... *G01J 5/04* (2013.01); *G01J 5/02* (2013.01); *G01J 5/023* (2013.01); *G01J 5/046* (2013.01); *G01J 5/20* (2013.01)

(58) Field of Classification Search
CPC ............... G01J 5/00; G01J 5/023; G01J 5/02; G01J 5/046
USPC ........... 438/57; 257/428, 9; 250/338.1, 336.1; 977/720, 778, 788, 810, 811, 954, 955
See application file for complete search history.

(56) References Cited

U.S. PATENT DOCUMENTS 5,288,649 A * 2/1994 Keenan ........................... 438/54
2008/0251723 A1* 10/2008 Ward et al. ................. 250/338.4

* cited by examiner

*Primary Examiner* — Yara B Green (57) ABSTRACT

A microbolometer includes a micro-bridge structure for uncooling infrared or terahertz detectors. The thermistor and light absorbing materials of the micro-bridge structure are the vanadium oxide-carbon nanotube composite film formed by one-dimensional carbon nanotubes and two-dimensional vanadium oxide film. The micro-bridge is a three-layer sandwich structure consisting of a layer of amorphous silicon nitride base film as the supporting and insulating layer of the micro-bridge, a layer or multi-layer of vanadium oxide-carbon nanotube composite film in the middle of the micro-bridge as the heat sensitive and light absorbing layer of the microbolometer, and a layer of amorphous silicon nitride top film as the stress control layer and passivation of the heat sensitive film. The microbolometer and method for manufacturing the same can overcome the shortcomings of the prior art, improve the performance of the device, reduce the cost of raw materials and is suitable for large-scale industrial production.

14 Claims, 4 Drawing Sheets

MICROBOLOMETER FOR INFRARED DETECTOR OR TERAHERTZ DETECTOR AND METHOD FOR MANUFACTURING THE SAME

BACKGROUND OF THE PRESENT INVENTION

1. Field of Invention

The present invention relates to uncooling infrared and terahertz detectors, and more particularly to a microbolometer and method for manufacturing the same.

2. Description of Related Arts

The infrared detector transforms the invisible infrared heat radiation into the detectable electrical signal to achieve the observation to the external affairs. There are two kinds of infrared detectors: the quantum detector and the thermal detector. The thermal detector is also known as the uncooling infrared detector which can be operated at the room temperature, and has some advantages of good stability, high integration and low price, and wide application prospect in the military, commercial and civil fields. The pyroelectric, thermocouple and thermal resistor are three main types of the uncooling infrared detector, wherein the microbolometer focal plane detector based on the thermal resistor is a rapidly developed uncooling infrared detector in recent years (referring to Leonard P. Chen, "Advanced FPAs for Multiple Applications" Proc. SPIE, 4721, 1-15 (2002) literature). The terahertz detector transforms the electromagnetic wave radiation of the terahertz band with the longer wavelength into the detectable electrical signal to achieve the observation to the external affairs. There are various types of terahertz detectors, wherein the uncooling terahertz microbolometer has the similar structure with the uncooling infrared microbolometer, so it can be obtained by improving the latter. The infrared or terahertz radiation detection process of the microbolometer is mainly achieved by the suspended micro-bridge. Therefore, the suspended micro-bridge is the key to affect the manufacture and performance of the device. The microbolometer has some special demands, which are reflected in that the related materials should have proper electrical, optical and mechanical properties, for the film materials of the suspended micro-bridge, especially the core thermistor material.

A lot of materials can be used as the thermistor material of the microbolometer. The vanadium oxide films have excellent electrical and optical properties, and high integration while preparing. Therefore, they are the most commonly used thermistor materials of the high-performance microbolometer and widely used in the uncooling infrared and terahertz detectors. The U.S. Pat. No. 6,489,613, which is applied by Toru Mori and Katsuya Kawano, NEC Company and patented on Dec. 3, 2002, discloses a method of manufacturing the vanadium oxide films for the microbolometer. In this invention, some special metals are doped into the vanadium oxide by sol-gel technology such that the electrical properties of the vanadium oxide meet the demands of the device. Literature H. Jerominek, F. Picard, et al., "Micromachined, uncooling, $VO_2$-based, IR bolometer arrays", Proc. SPIE, 2746, 60-71 (1996) discloses a micro-bridge structure of the microbolometer based on the vanadium oxide thermistor film. However, the electric structure of the vanadium atom is $3d^3 4s^2$, wherein 4s and 3d orbits can lose some or all electrons, so the vanadium oxide films prepared by the conventional method have some inherent shortcomings of complex valence of element V in the vanadium oxide films, and poor stability of the chemical structures of the films. For example, while preparing the vanadium oxide films by magnetron sputtering, element V generally has 0, +2, +3, +4 and +5 valences (referring to Xiaomei. Wang, Xiangdong. Xu, et al., "Controlling the growth of VOx films for various optoelectronic applications", Proceedings of the 2009 16th IEEE International Symposium on the Physical and Failure Analysis of Integrated Circuits, IPFA, p 572-576 (2009) literature). Since element V has the complex composition, slight fluctuation in the preparation process might greatly impact on the chemical compositions of the vanadium oxide films, so that the electrical, optical and mechanical properties of the films are significantly changed, thereby affecting the performance of the device. Therefore, the main shortcomings of the microbolometer based on the vanadium oxide films are that the preparation is difficult, and the repeatability and stability of the product are poor.

On the other hand, carbon nanotubes are very important one-dimensional nanomaterials. Since 1991, Japanese Iijima found the carbon nanotubes (referring to Sumio Iijima, "Helical microtubules of graphitic carbon", Nature, 354, 56, (1991) literature), more and more researches have shown that these special one-dimensional nanomaterials have some unique physical and chemical properties, and broad application prospects. Firstly, carbon nanotubes have excellent chemical stability. In the vacuum condition, carbon nanotubes can maintain the stable chemical structures at 1200° C. Furthermore, in the atmospheric environment, carbon nanotubes can maintain the stable chemical structures under 650° C. Obviously, the chemical stability of the carbon nanotubes is higher than that of the vanadium oxide films. In addition, carbon nanotubes have excellent electrical and optical properties. For example, it is reported that the temperature coefficient of resistance (TCR) of carbon nanotubes can reach 0.3-2.5%/K, and the optical absorption coefficient of carbon nanotubes can reach $10^{4-5}$ cm$^{-1}$ under certain conditions (referring to M. E. Itkis, F. Borondics, A. Yu, R. C. Haddon, "Bolometric Infrared Photoresponse of Suspended Single-Walled Carbon Nanotube Films", Science, 312, 413-416 (2006) literature). Therefore, carbon nanotubes hold great potential for acting as thermistor materials, and are capable of overcoming the shortcoming of poor chemical stability of the conventional heat sensitive films, such as vanadium oxide and etc.

Currently, a variety of tries are made in the application field of the carbon nanotube device. U.S. Pat. No. 7,057,402B2 applied by Barrett E. Cole, et al., Honeywell Company and patented on Jun. 6, 2006 discloses a sensor based on the carbon-nanotubes. This invention improves the absorbing properties of the material to infrared light by catalyst-inducing the growth of upwardly standing carbon nanotube bundles, so that the temperature of the system is increased under the action of infrared light, the corresponding temperature changes are measured by the Pt sensor under the carbon nanotubes. In this invention, the standing carbon-nanotubes play a major role in absorbing the infrared light.

Chinese patent ZL 02114434.6 applied by Junhua Liu, et al., and patented on Jan. 26, 2005 discloses a carbon nanotube film micromachined infrared detector. This invention takes the carbon nanotubes as the absorbing material for infrared radiation. By measuring the changes of the thermal warpage or the natural oscillation frequency of the micromachined infrared detector which are caused by the carbon nanotubes, the detection of the radiation intensity is achieved. Chinese patent ZL 200320109976.X applied by Junhua Liu, et al., and patented on May 4, 2005 discloses a carbon nanotube film piezoresistive heat-sensitive infrared detector. Also, this invention takes the carbon nanotubes as the infrared light absorbing and heat sensitive materials. When the micromachine is optically radiated, the thermal warpage or the resonance frequency drift will appear, so that the piezoresistive factor of the carbon nanotubes on the micromachine is changed. Using the piezoresistive effect of the carbon nanotubes, the temperature distribution is sensed by the drift of the resistance change frequency of the carbon nanotubes, thereby measuring the radiation intensity. This invention resolves the low sensitivity and high cost of the pyroelectric detector. However, the carbon nanotubes, especially the carbon nanotubes reclining on the surface of the substrate have non-ideal infrared absorbing performance (referring to Z. Wu, Z. Chen, et al., "Transparent, Conductive Carbon Nanotube Films", Science, 305, 1273-1276 (2004)). This shortcoming will seriously impact on the performance of related device.

Recent studies show that constructing the carbon nanotubes in the suspended structure can obviously improve the heat sensitive property of the carbon nanotubes, which can meet the demands of infrared detection under certain conditions (referring to M. E. Itkis, F. Borondics, A. Yu, R. C. Haddon, "Bolometric Infrared Photoresponse of Suspended Single-Walled Carbon Nanotube Films", Science, 312, 413-416 (2006) literature). However, this structure based on the single carbon nanotubes has an obvious shortcoming that, π electrons of the carbon nanotubes have stronger conductivity, and consequently, direct application of the single carbon nanotubes as the heat sensitive material will lead to a very small resistance of the film. Therefore, the slight change of the carbon nanotube resistance caused by infrared radiation only can be detected in the ultra-low temperature of liquid helium condition, which shows that the micro-bridge structure based on the single carbon nanotubes can not meet the demands of the uncooling infrared detector, and more particularly the uncooling terahertz detector with higher sensitivity requirement. The conventional method for increasing the carbon nanotube resistance is as below. Disperse the carbon nanotubes in some polymer systems, such as polycarbonate and polystyrene to form the carbon nanotube-polymer composite films (referring to A. E. Aliev, "Bolometric detector on the basis of single-wall carbon nanotube/polymer composite", Infrared Physics & Technology, 51, 541-545 (2008) literature). Although these carbon nanotube-polymer composite films can meet the demand for the electrical properties of the microbolometer, they have another shortcoming, namely, in the wavelength of 1-10 μm, the absorbing capability of the carbon nanotubes to infrared light is poor (absorbing coefficient is small), the absorbance is only 10% (referring to Z. Wu, Z. Chen, et al., "Transparent, Conductive Carbon Nanotube Films", Science, 305, 1273-1276 (2004)). Common polymer materials are not helpful for improving the optical properties of the carbon nanotubes. Therefore, it is difficult for the common composite materials of carbon nanotube and polymer to meet the demands of the infrared or terahertz detectors for light absorption performance.

In short, the conductivity and chemical stability of the vanadium oxide films have some deficiencies and need to be improved. Also, the carbon nanotubes have some deficiencies in the electrical and optical properties. Therefore, the single carbon nanotubes or common carbon nanotube-polymer composite films are not suitable for direct application in the uncooling infrared or terahertz detectors to act as the infrared or terahertz light absorbing and thermistor materials.

SUMMARY OF THE PRESENT INVENTION

The problem to be resolved in the present invention is to provide a microbolometer and method for manufacturing the same, which is capable of overcoming the shortcomings of the prior art, improving the operating performance of the device and reducing the cost of raw materials, and suitable for large-scale industrial production.

To resolve the technical problem, the present invention provides a microbolometer comprising a micro-bridge structure, characterized in that the thermistor and light absorbing materials of the micro-bridge structure are the vanadium oxide-carbon nanotube composite film which is formed by one-dimensional carbon nanotubes and two-dimensional vanadium oxide film.

The microbolometer of the present invention is characterized in that the micro-bridge structure is a three-layer sandwich structure comprising a layer of amorphous silicon nitride base film as the supporting and insulating materials of the micro-bridge, a layer or multi-layer of vanadium oxide-carbon nanotube composite middle film as the heat sensitive and light absorbing layer of the microbolometer, and a layer of amorphous silicon nitride top film as the passivation layer of the heat sensitive film and the stress control layer.

Also, the present invention provides a first method for manufacturing the vanadium oxide-carbon nanotube composite film comprising the steps of:

(1) cleaning the substrate, and drying the cleaned substrate by $N_2$;

(2) putting the prepared carbon nanotubes into the beaker, mixing with the organic solvent and ultrasonically dispersing, and then moving the dispersion liquid onto the surface of the cleaned substrate and evaporating the solvent, thus forming the reticular interconnected carbon nanotube film;

(3) putting the substrate with the dispersed carbon nanotubes obtained in step (2) into the vacuum reactor, growing a layer of vanadium oxide film by the reactor, wherein the grown vanadium oxide is dispersed on the surfaces of the carbon nanotubes and at the gaps among the carbon nanotubes, and annealing, thus forming the vanadium oxide-carbon nanotube composite film;

(4) cooling the sample to the room temperature, and then taking the sample out of the reactor; and (5) as required, repeating the steps of dispersing the carbon nanotubes, depositing the vanadium oxide and annealing in turn, thus forming the multi-layer vanadium oxide-carbon nanotube composite film.

The first method for manufacturing the vanadium oxide-carbon nanotube composite film of the present invention is characterized in that in step (2), the dispersion method is spin coating, or electrophoresis, printing transplantation, wherein during the spin coating, the dispersion liquid is ethanol, or isopropanol, isobutanol, isoamyl alcohol, isohexanol, preferably, ethanol or isobutanol.

The first method for manufacturing the vanadium oxide-carbon nanotube composite film of the present invention is characterized in that the carbon nanotubes obtained in step (2) are provided transversely on the surface of the substrate, have the reticular interconnected structures, and are single-walled or multi-walled, wherein the carbon nanotubes have the diameter of 1-50 nm, preferably, 2 nm, 5 nm, 10 nm, 15 nm, 20 nm, 25 nm and 30 nm, and the carbon nanotubes have the length of 50-30000 nm, preferably 500 nm, 800 nm, 1000 nm, 1200 nm, 1500 nm and 2000 nm.

The first method for manufacturing the vanadium oxide-carbon nanotube composite film of the present invention is characterized in that in the step (2), the used carbon nanotubes are pristine or functionalized. The functionalization of the carbon nanotubes is as below. By the mixed acid (a mixture of concentrated $H_2SO_4$ and $HNO_3$), or concentrated nitric acid, potassium permanganate, Fenton method, and at the conditions of room temperature, heat and ultrasound, treat the surfaces of the carbon nanotubes in advance to introduce some special —COOH, —COH, —CNH$_2$ functional groups.

The first method for manufacturing the vanadium oxide-carbon nanotube composite film of the present invention is characterized in that in the step (3), the vanadium oxide can be prepared by magnetron sputtering, or electron beam evaporation, metal organic compound chemical vapor deposition (MOCVD), atomic layer deposition (ALD). While using the magnetron sputtering, the target material can be metal vanadium, or VOx (wherein 1.0≤x≤2.5), the reaction gas is the mixture of argon and oxygen, wherein the percentage of oxygen in the mixture is 0.2-20%, preferably, 1%, 1.5%, 2%, 2.5%, 3%, 3.5%, 4%, 4.5%, 5%, 5.5% and 6%; the deposition temperature is 20-500° C., preferably, 100° C., 150° C., 200° C., 220° C., 250° C., 270° C., 300° C., 320° C., 350° C., 370° C., and 390° C.

Also, the present invention provides a second method for manufacturing the vanadium oxide-carbon nanotube composite film, comprising the steps of:

(1) cleaning the substrate, and drying the cleaned substrate by N$_2$;

(2) directly growing the reticular interconnected carbon nanotube film, induced by metal catalyst, on the surface of the cleaned substrate using the chemical vapor deposition system, or the arc discharge system, the laser deposition reactor;

(3) putting the substrate with the grown carbon nanotubes obtained in step (2) into the vacuum reactor, growing a layer of vanadium oxide film by the reactor, wherein the grown vanadium oxide is dispersed on the surfaces of the carbon nanotubes and the gaps among the carbon nanotubes, and annealing, thus forming the vanadium oxide-carbon nanotube composite film;

(4) cooling the sample to the room temperature, and then taking the sample out of the reactor; and (5) as required, repeating the steps of growing the carbon nanotubes, depositing the vanadium oxide and annealing in turn, thus forming the multi-layer vanadium oxide-carbon nanotube composite film.

The second method for manufacturing the vanadium oxide-carbon nanotube composite film of the present invention is characterized in that in step (2), when the chemical vapor deposition system acts as the reactor for growing the one-dimensional carbon nanotubes of the composite film, the reaction gas can be selected from the group consisting of methane (CH$_4$), ethylene (C$_2$H$_2$), acetylene (C$_2$H$_2$) and benzene (C$_6$H$_6$), the catalyst is simultaneously selected from the group consisting of Fe, Co and Ni for inducing the carbon nanotubes to directly grow on the surface of the substrate, the grow temperature of the carbon nanotube is 300° C.-1100° C., preferably, 400° C., 450° C., 500° C., 550° C., 600° C., 650° C. and 700° C.

The second method for manufacturing the vanadium oxide-carbon nanotube composite film of the present invention is characterized in that the carbon nanotubes obtained in step (2) are provided transversely on the surface of the substrate, and have the reticular interconnected structures. They are single-walled or multi-walled. They have the diameter of 1-50 nm, preferably, 2 nm, 5 nm, 10 nm, 15 nm, 20 nm, 25 nm and 30 nm. They have the length of 50-30000 nm, preferably 500 nm, 800 nm, 1000 nm, 1200 nm, 1500 nm and 2000 nm.

The second method for manufacturing the vanadium oxide-carbon nanotube composite film of the present invention is characterized in that in the step (3), the vanadium oxide can be prepared by magnetron sputtering, or electron beam evaporation, metal organic compound chemical vapor deposition (MOCVD), atomic layer deposition (ALD). While using the magnetron sputtering, the target material can be metal vanadium, or VOx (wherein 1.0≤x≤2.5), the reaction gas is the mixture of argon and oxygen, wherein the percentage of oxygen in the mixture is 0.2-20%, preferably, 1%, 1.5%, 2%, 2.5%, 3%, 3.5%, 4%, 4.5%, 5%, 5.5% and 6%; the deposition temperature is 20-500° C., preferably, 100° C., 150° C., 200° C., 220° C., 250° C., 270° C., 300° C., 320° C., 350° C., 370° C., and 390° C.

Also, the present invention provides a third method for manufacturing the vanadium oxide-carbon nanotube composite film, comprising the steps of:

(1) cleaning the substrate, and drying the cleaned substrate;

(2) mixing a certain amount of vanadium oxide powder with the organic solvent, heating, removing the insoluble matters by once or repeatedly centrifugal separation, extracting the supernatant fluid, and quietly placing, thus obtaining the vanadium oxide organic sol;

(3) adding a certain amount of carbon nanotubes into the vanadium oxide organic sol obtained in step (2), dispersing by ultrasound or stirring, thus forming the new sol mixing the vanadium oxide with the carbon nanotubes;

(4) coating the new sol mixing the vanadium oxide with the carbon nanotubes obtained in step (3) on the surface of the cleaned substrate in the spinning manner, and then annealing, thus forming the vanadium oxide-carbon nanotube composite film; and (5) as required, repeating the steps of preparing the organic sol, mixing the vanadium oxide with the carbon nanotubes, coating the sol in the spinning manner and annealing in turn, thus forming the multi-layer vanadium oxide-carbon nanotube composite film.

The third method for manufacturing the vanadium oxide-carbon nanotube composite film of the present invention is characterized in that in step (2), the solvent for preparing the vanadium oxide sol is the mixture of the organic solvent A and the organic solvent B, wherein the organic solvent A is benzyl alcohol, the organic solvent B is isopropyl alcohol, or isobutyl alcohol, isoamyl alcohol, isohexanol, preferably, isobutyl alcohol.

The third method for manufacturing the vanadium oxide-carbon nanotube composite film of the present invention is characterized in that in the step (3), the used carbon nanotubes are pristine or functionalized. The functionalization of the carbon nanotubes is as below. By the mixed acid (a mixture of concentrated H$_2$SO$_4$ and HNO$_3$), concentrated nitric acid, potassium permanganate or Fenton method, at the conditions of room temperature, heat and ultrasound, treat the surfaces of the carbon nanotubes in advance to introduce some special —COOH, —COH, —CNH$_2$ functional groups.

The third method for manufacturing the vanadium oxide-carbon nanotube composite film of the present invention is characterized in that in the step (3), the added carbon nanotubes are the carbon nanotube solid substances without mixing with any solvents, or the carbon nanotube suspension liquid mixing with the organic solvent in advance.

Also, the present invention provides a first method for manufacturing the microbolometer, comprising the steps of:

(A) cleaning the monocrystalline silicon substrate including the readout circuit (ROIC), depositing a layer of amorphous silicon dioxide film by the reactor as the passivation layer, wherein the thickness of the amorphous silicon dioxide film is 300-1500 nm, preferably, 600 nm, 700 nm, 800 nm, 900 nm, and 1000 nm;

(B) depositing a layer of metal aluminum on the surface of the silicon dioxide passivation layer by the reactor as the reflecting layer of the micro-bridge, wherein the thickness of the metal aluminum is 100-1000 nm, preferably, 150 nm, 200 nm, 250 nm, 300 nm, 350 nm, 400 nm, 450 nm and 500 nm;

(C) photolithographing the patterns of the bridge piers of the suspended micro-bridge on the surface of metal aluminum, and etching the metal aluminum to the silicon dioxide passivation layer, thus forming the micro-bridge pier holes and metal aluminum islands;

(D) coating a layer of photosensitive polyimide film in the spin manner on the surface of the metal aluminum, wherein the thickness of the photosensitive polyimide film is 1-4 μm, preferably, 1 μm, 1.5 μm, 2 μm, and 2.5 μm;

(E) photolithographing the photosensitive polyimide film to form the polyimide film islands and pier holes of the suspended micro-bridge, and then making the imine treatment;

(F) depositing a layer of amorphous silicon nitride film on the surfaces of the polyimide film islands and pier holes by the reactor as the supporting and insulating material of the micro-bridge, wherein the thickness of the amorphous silicon nitride film is 10-1500 nm, and then preparing the vanadium oxide-carbon nanotube composite film comprising:

(F1) cleaning the substrate, and drying the cleaned substrate;

(F2) putting the prepared pristine or functionalized carbon nanotubes into the beaker, mixing with the organic solvent and ultrasonically dispersing, and then moving the dispersion liquid onto the surface of the cleaned substrate and evaporating the solvent, thus forming the reticular interconnected carbon nanotube film;

(F3) putting the substrate with the dispersed carbon nanotubes into the vacuum reactor, growing a layer of vanadium oxide film by the reactor, wherein the grown vanadium oxide is dispersed on the surfaces of the carbon nanotubes and at the gaps among the carbon nanotubes, and annealing, thus forming the vanadium oxide-carbon nanotube composite film;

(F4) cooling the sample to the room temperature, and then taking the sample out of the reactor; and (F5) as required, repeating the steps of dispersing the carbon nanotubes, depositing the vanadium oxide and annealing in turn, thus forming the multi-layer vanadium oxide-carbon nanotube composite film;

(G) depositing a layer of metal with the thickness of 10-500 nm by the reactor and patterning to act as the electrodes of the device;

(H) lastly, depositing a layer of amorphous silicon nitride film with the thickness of 10-1500 nm on the surfaces of the metal electrodes and the vanadium oxide-carbon nanotube composite film by the reactor as the passivation layer of the electrodes and the sensitive film and the control layer of the stress of the device;

(I) photolithographing the pattern of the suspended micro-bridge on the surface of the composite film mentioned above, etching the composite film to the polyimide layer, thus forming the bridge deck, the bridge legs and the bridge piers; and (J) removing the polyimide film at the bottom of the pattern of the bridge deck and the bridge legs by oxygen plasma to form the cavity, thus obtaining the microbolometer.

Also, the present invention provides a second method for manufacturing the microbolometer, comprising the steps of:

(A) cleaning the monocrystalline silicon substrate including the readout circuit (ROIC), depositing a layer of amorphous silicon dioxide film by the reactor as the passivation layer, wherein the thickness of the amorphous silicon dioxide film is 300-1500 nm, preferably, 600 nm, 700 nm, 800 nm, 900 nm, and 1000 nm;

(B) depositing a layer of metal aluminum on the surface of the silicon dioxide passivation layer by the reactor as the reflecting layer of the micro-bridge, wherein the thickness of the metal aluminum is 100-1000 nm, preferably, 150 nm, 200 nm, 250 nm, 300 nm, 350 nm, 400 nm, 450 nm and 500 nm;

(C) photolithographing the patterns of the bridge piers of the suspended micro-bridge on the surface of metal aluminum, and etching the metal aluminum to the silicon dioxide passivation layer, thus forming the micro-bridge pier holes and metal aluminum islands;

(D) coating a layer of photosensitive polyimide film in the spin manner on the surface of the metal aluminum, wherein the thickness of the photosensitive polyimide film is 1-4 μm, preferably, 1 μm, 1.5 μm, 2 μm, and 2.5 μm;

(E) photolithographing the polyimide film to form the polyimide film islands and pier holes of the suspended micro-bridge, and then making the imine treatment;

(F) depositing a layer of amorphous silicon nitride film on the surface of the polyimide film islands and pier holes by the reactor as the supporting and insulating material of the micro-bridge, wherein the thickness of the amorphous silicon nitride film is 10-1500 nm, and then preparing the vanadium oxide-carbon nanotube composite film comprising:

(F1) cleaning the substrate, and drying the cleaned substrate by $N_2$;

(F2) directly growing the reticular interconnected carbon nanotube film, induced by metal catalyst, on the surface of the cleaned substrate using the chemical vapor deposition system, or the arc discharge system, the laser deposition reactor;

(F3) putting the substrate with the grown carbon nanotubes into the vacuum reactor, growing a layer of vanadium oxide film by the reactor, wherein the grown vanadium oxide is dispersed on the surfaces of the carbon nanotubes and the gaps among the carbon nanotubes, and annealing, thus forming the vanadium oxide-carbon nanotube composite film;

(F4) cooling the sample to the room temperature, and then taking the sample out of the reactor; and (F5) as required, repeating the steps of growing the carbon nanotubes, depositing the vanadium oxide and annealing in turn, thus forming the multi-layer vanadium oxide-carbon nanotube composite film;

(G) depositing a layer of metal with the thickness of 10-500 nm by the reactor and patterning to act as the electrodes of the device;

(H) lastly, depositing a layer of amorphous silicon nitride film with the thickness of 10-1500 nm on the surfaces of the metal electrodes and the vanadium oxide-carbon nanotube composite film by the reactor as the passivation layer of the electrodes and the sensitive film and the control layer of the stress of the device;

(I) photolithographing the pattern of the suspended micro-bridge on the surface of the composite film mentioned above, etching the composite film to the polyimide layer, thus forming the bridge deck, the bridge legs and the bridge piers; and (J) removing the polyimide film at the bottom of the pattern of the bridge deck and the bridge legs by oxygen plasma to form the cavity, thus obtaining the microbolometer.

Also, the present invention provides a third method for manufacturing the microbolometer, comprising the steps of:

(A) cleaning the monocrystalline silicon substrate including the readout circuit (ROIC), depositing a layer of amorphous silicon dioxide film by the reactor as the passivation layer, wherein the thickness of the amorphous silicon dioxide film is 300-1500 nm, preferably, 600 nm, 700 nm, 800 nm, 900 nm, and 1000 nm;

(B) depositing a layer of metal aluminum on the surface of the silicon dioxide passivation layer by the reactor as the reflecting layer of the micro-bridge, wherein the thickness of the metal aluminum is 100-1000 nm, preferably, 150 nm, 200 nm, 250 nm, 300 nm, 350 nm, 400 nm, 450 nm and 500 nm;

(C) photolithographing the patterns of the bridge piers of the suspended micro-bridge on the surface of metal aluminum, and etching the metal aluminum to the silicon dioxide passivation layer, thus forming the micro-bridge pier holes and metal aluminum islands;

(D) coating a layer of photosensitive polyimide film in the spin manner on the surface of the metal aluminum, wherein the thickness of the photosensitive polyimide film is 1-4 µm, preferably, 1 µm, 1.5 µm, 2 µm, and 2.5 µm;

(E) photolithographing the polyimide film to form the polyimide film islands and pier holes of the suspended micro-bridge, and then making the imine treatment;

(F) depositing a layer of amorphous silicon nitride film on the surface of the polyimide film islands and pier holes by the reactor as the supporting and insulating material of the micro-bridge, wherein the thickness of the amorphous silicon nitride film is 10-1500 nm, and then preparing the vanadium oxide-carbon nanotube composite film comprising:

(F1) cleaning the substrate, and drying the cleaned substrate;

(F2) mixing a certain amount of vanadium oxide powder with the organic solvent, heating, removing the insoluble matters by once or repeatedly centrifugal separation, extracting the supernatant fluid, and quietly placing, thus obtaining the vanadium oxide organic sol;

(F3) adding a certain amount of carbon nanotubes into the vanadium oxide organic sol obtained in step (F2), dispersing by ultrasound or stirring, thus forming the new sol mixing the vanadium oxide with the carbon nanotubes;

(F4) coating the new sol mixing the vanadium oxide with the carbon nanotubes obtained in step (F3) on the surface of the cleaned substrate in the spinning manner, and then annealing, thus forming the vanadium oxide-carbon nanotube composite film; and (F5) as required, repeating the steps of preparing the organic sol, mixing the vanadium oxide with the carbon nanotubes, coating the sol in the spinning manner and annealing in turn, thus forming the multi-layer vanadium oxide-carbon nanotube composite film;

(G) depositing a layer of metal with the thickness of 10-500 nm by the reactor and patterning to act as the electrodes of the device;

(H) lastly, depositing a layer of amorphous silicon nitride film with the thickness of 10-1500 nm on the surfaces of the metal electrodes and the vanadium oxide-carbon nanotube composite film by the reactor as the passivation layer of the electrodes and the sensitive film and the control layer of the stress of the device;

(I) photolithographing the pattern of the suspended microbridge on the surface of the composite film mentioned above, etching the composite film to the polyimide layer, thus forming the bridge deck, the bridge legs and the bridge piers; and (J) removing the polyimide film at the bottom of the pattern of the bridge deck and the bridge legs by oxygen plasma to form the cavity, thus obtaining the microbolometer.

In the method for preparing the microbolometer, the reactor for the deposition of the base and top silicon nitride films of the micro-bridge of the microbolometer is the plasma enhanced chemical vapor deposition (PECVD) system, or low pressure chemical vapor deposition (LPCVD) system, ultra-high vacuum chemical vapor deposition (UHVCVD) system, electron beam evaporation system, laser deposition system, magnetron sputtering system. The thickness of the base and top silicon nitride films of the micro-bridge of the microbolometer is 10-1500 nm, preferably, 50 nm, 100 nm, 150 nm, 200 nm, 250 nm, 300 nm, 350 nm, 400 nm, 450 nm and 500 nm. The middle layer of the micro-bridge of the microbolometer is vanadium oxide-carbon nanotube composite film with the thickness of 10-1500 nm, preferably, 50 nm, 80 nm, 100 nm, 120 nm, 150 nm, 200 nm, 250 nm, 300 nm, 350 nm, 400 nm, 450 nm, and 500 nm. The electrodes of the microbolometer are made of metal aluminum, or aurum, titanium, titanium compound, nickel-chromium alloy. While metal aluminum is used for the electrodes of the microbolometer, the thickness of each of the electrodes is 10-500 nm, preferably, 50 nm, 60 nm, 80 nm, 100 nm, 120 nm, 150 nm, 200 nm, 250 nm, 300 nm, 350 nm, and 400 nm.

To meet the special demands of the micro-bridge of the microbolometer, and overcome the shortcomings in the material properties and preparing methods for the existing vanadium oxide thermistor thin film in the device, the present invention takes the composite material of one-dimensional carbon nanotubes and two-dimensional vanadium oxide as the thermistor material and light absorbing material of the microbolometer. On the one hand, the low conductivity and poor chemical stability of the conventional vanadium oxide thermistor film is improved by the excellent chemical stability, mechanical properties and conductivity of the carbon nanotubes. Simultaneously, the negative impacts caused by the conventional doping process on the vanadium oxide film are avoided. On the other hand, the high resistance, the excellent temperature coefficient of resistance (TCR) and light absorbing property of the vanadium oxide are used to make up the shortcomings of the carbon nanotubes in these aspects, thereby improving the comprehensive performance of the device. On this basis, the film property of the device can be more easily and accurately adjusted by changing the proportion of vanadium oxide to carbon nanotube to meet the special demands of the infrared or terahertz detectors. Moreover, in the present invention, the silicon nitride film and the vanadium oxide-carbon nanotube composite film form a three-layer sandwich structure for constructing the micro-bridge structure of the microbolometer, so as to improve the film stress gradient which is originally steep and changes monotonically, effectively reduce the residual stress of the micro-bridge, and better control the mechanical and optical properties of the device. On this basis, the film stress of the device can be more easily and accurately adjusted by changing the proportion of vanadium oxide to carbon nanotube to meet the special demands of the micro-bridge. The heat-sensitive material and light absorbing material of the uncooling microbolometer manufactured made up by the composite material of the special one-dimensional nano-material and two-dimensional thin film can improve the operating characteristic of the device, reduce the manufacturing cost of raw materials and is suitable for large-scale industrial production.

These and other objectives, features, and advantages of the present invention will become apparent from the following detailed description, the accompanying drawings, and the appended claims.

Here, 1: silicon substrate; 2: silicon dioxide passivation layer; 3: metal Al reflecting layer; 4: polyimide film; 5: composite three-layer sandwich structure; 6: metal electrode; 7: suspended micro-bridge; 8: microbolometer; 510: silicon nitride base film; 520: vanadium oxide-carbon nanotube composite film; 521: carbon nanotube in the vanadium oxide-carbon nanotube composite film; 522: vanadium oxide in the vanadium oxide-carbon nanotube composite film; 530: silicon nitride top film; 710: bridge deck; 720: bridge leg; 730: bridge pier; 740: optical resonator.

DETAILED DESCRIPTION OF THE PREFERRED EMBODIMENT

The present invention is further explained in detail with the accompanying drawings.

Figure 1:
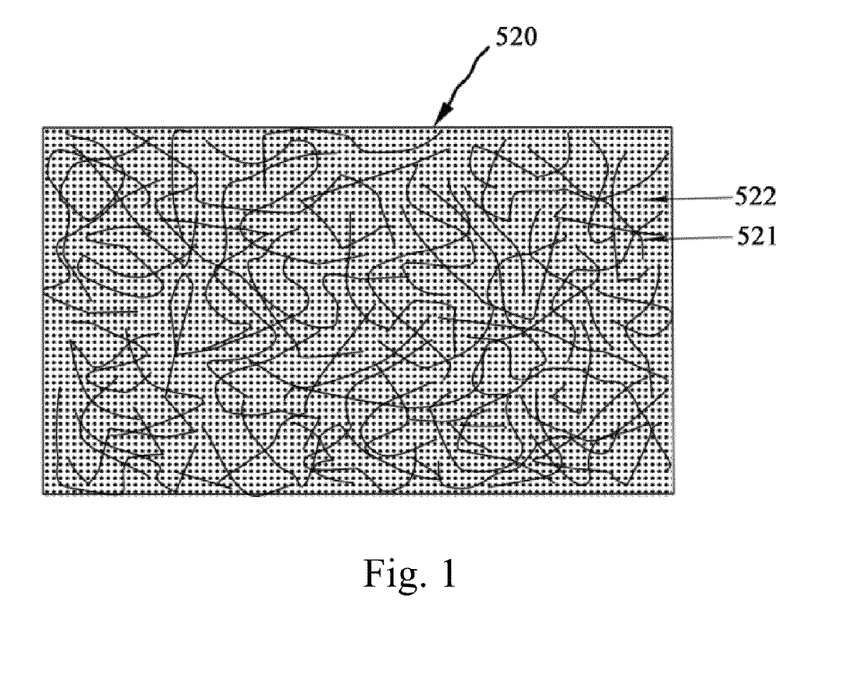
FIG. 1 is a planar graph of a vanadium oxide-carbon nanotube composite film according to a preferred embodiment of the present invention.
Figure 2:
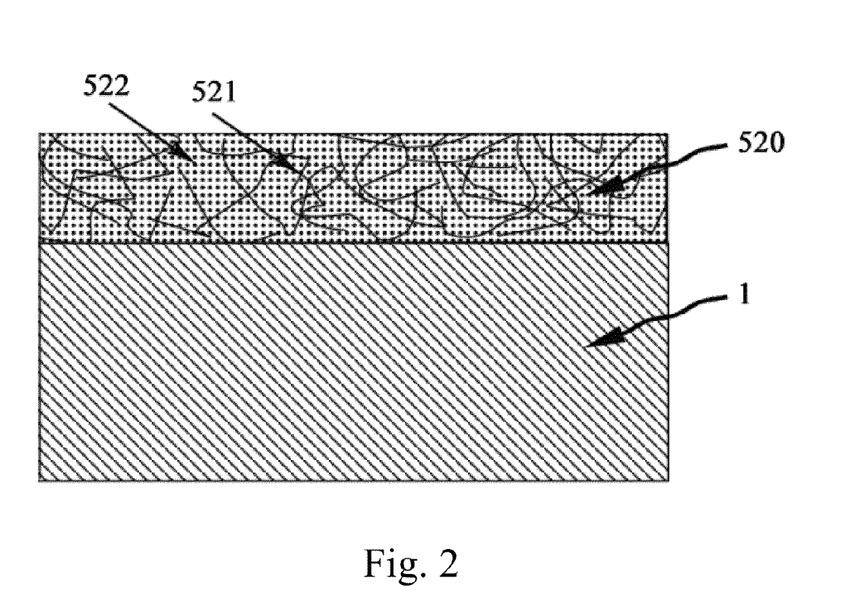
FIG. 2 is a sectional view of the single-layer vanadium oxide-carbon nanotube composite film of the present invention.
Figure 3:
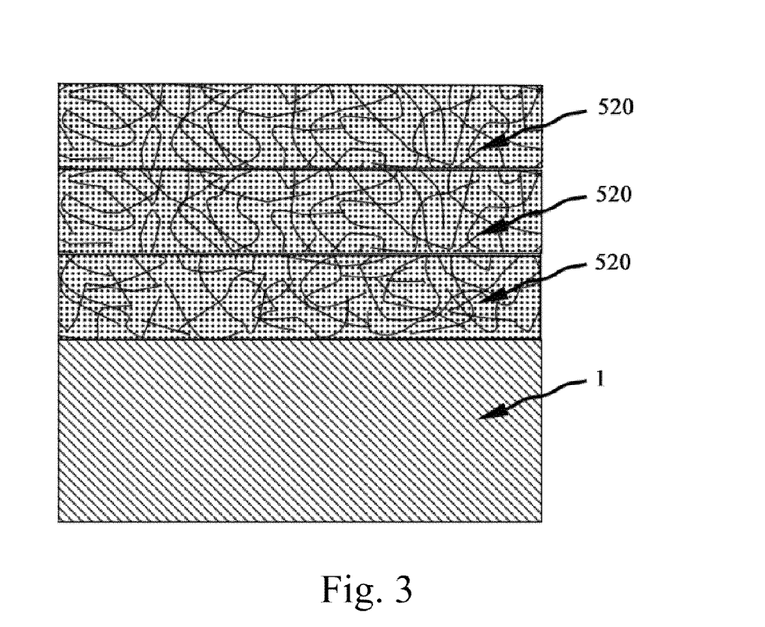
FIG. 3 is a sectional view of the multi-layer vanadium oxide-carbon nanotube composite film of the present invention.
Figure 5:
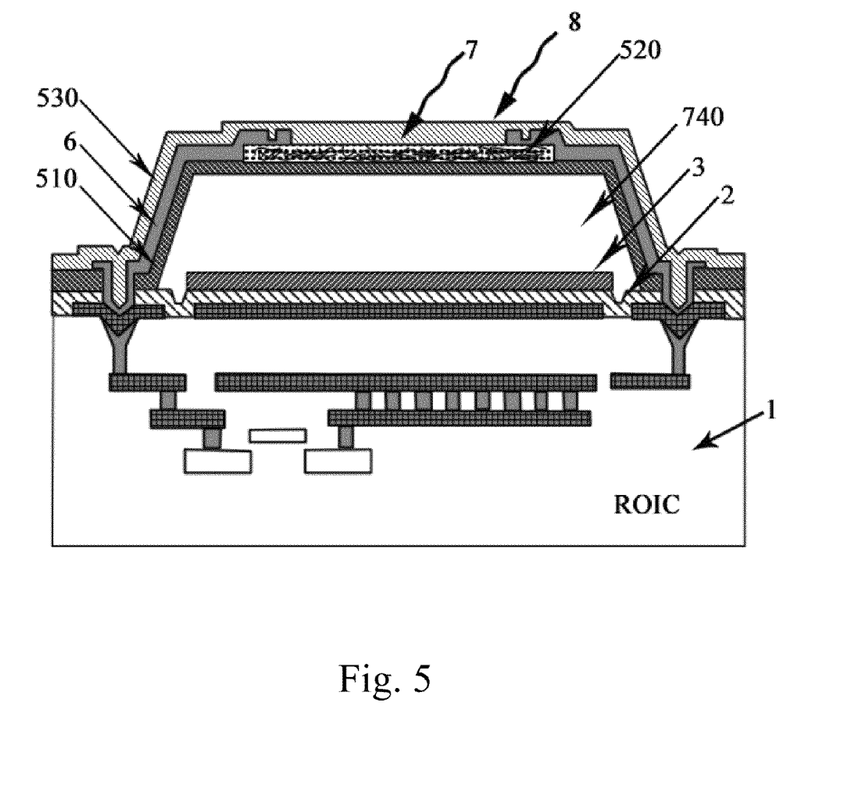
FIG. 5 is a sectional view of the micro-bridge of the microbolometer based on the vanadium oxide-carbon nanotube composite film of the present invention.
Figure 6:
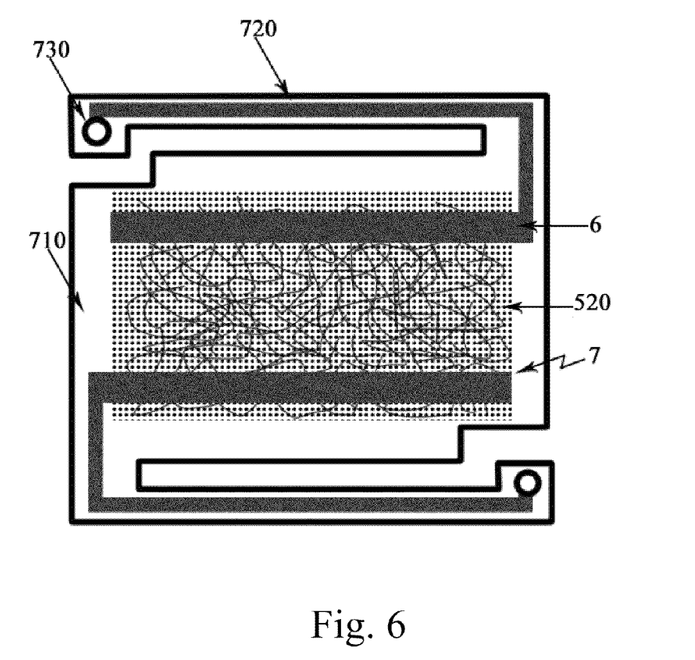
FIG. 6 is a planar graph of the micro-bridge of the microbolometer based on the vanadium oxide-carbon nanotube composite film of the present invention.
Figure 7:
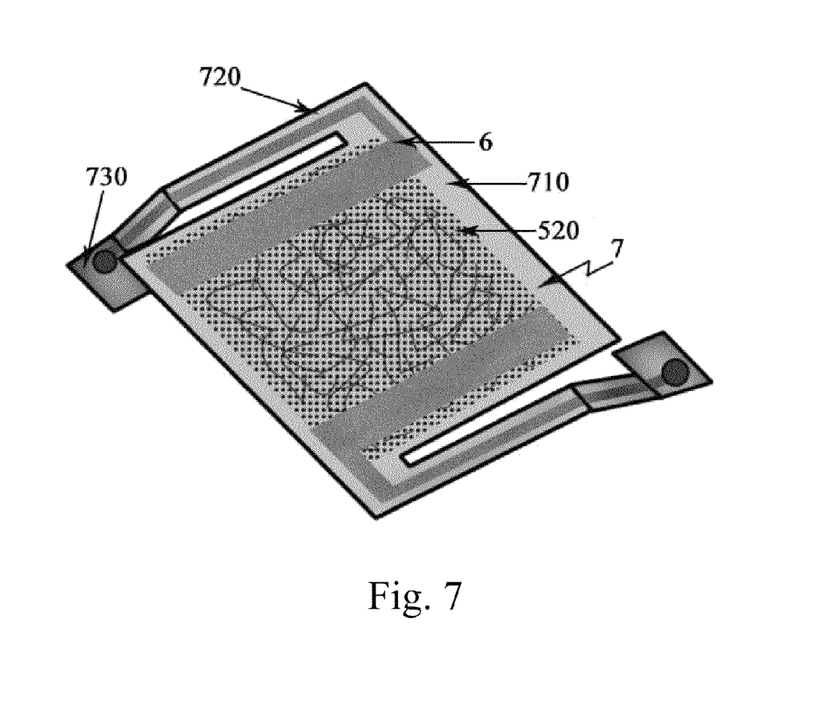
FIG. 7 is a three-dimensional map of the micro-bridge of the microbolometer based on the vanadium oxide-carbon nanotube composite film of the present invention.

I The Method for Manufacturing the Composite Material of the One-dimensional Carbon Nanotubes and Two-dimensional Vanadium Oxide Film The guiding ideology of the present invention is to prepare the composite film with excellent comprehensive properties (as shown in FIG. 1) as the thermistor and light absorbing materials (as shown in FIGS. 5, 6 and 7) to improve the properties of the infrared or terahertz detectors using the respective excellent electrical and optical properties of the carbon nanotube and the vanadium oxide in the vanadium oxide-carbon nanotube composite film structure. The method for manufacturing the vanadium oxide-carbon nanotube composite film comprises the steps as follows. (1) Select the silicon wafer as the substrate 1 for growing the film thereon, firstly treat the silicon wafer by Piranha solution and clean the treated silicon wafer by deionized water, and then soak the cleaned silicon wafer by dilute hydrofluoric acid solution, dry the soaked silicon wafer by nitrogen, transfer the dried silicon wafer into a plasma-enhanced chemical vapor deposition system (PECVD), and vacuumize the PECVD system. (2) Grow a layer of amorphous silicon nitride base film 510 with the thickness of 10-1500 nm on the surface of the silicon substrate 1 at 300° C. by the PECVD, wherein $SiH_4$ and $NH_3$ act as the reaction gases. (3) Firstly put the prepared carbon nanotubes in the beaker, mix with the organic solvent and ultrasonically disperse, and then move the dispersion liquid onto the surface of the clean substrate, evaporate the solvent, thus forming the reticular interconnected carbon nanotube film 521 on the surface of the amorphous silicon nitride base film 510. (4) Put the substrate 1 with the carbon nanotubes 521 dispersed on the surface thereof into the vacuum reactor, take the metal vanadium as the target material, take argon as the sputtering gas, and take oxygen as the reaction gas to grow a layer of vanadium oxide film 522 with a thickness of 10-1500 nm at 200° C. by the DC reactive magnetron sputtering and anneal, thus forming the vanadium oxide-carbon nanotube composite film 520, wherein the vanadium oxide film 522 cover the surfaces of the carbon nanotubes 521 and the gaps among the carbon nanotubes. (5) Repeat the steps of dispersing the carbon nanotubes 521, depositing the vanadium oxide 522 and annealing as required to form the vanadium oxide-carbon nanotube multi-layer composite film structure 520. (6) Grow a layer of amorphous silicon nitride top film 530 with a thickness of 10-1500 nm on the surface of the vanadium oxide-carbon nanotube composite film 520 at 300° C. by the PECVD, which acts as the passivation layer and stress control layer of the vanadium oxide-carbon nanotube composite film 520, wherein $SiH_4$ and $NH_3$ act as the reaction gases. (7) Cool the sample to the room temperature, and then take the sample out of the PECVD system. In the vanadium oxide-carbon nanotube composite film 520, the carbon nanotubes 521 are introduced to effectively improve the electrical properties, the optical properties and the stability of the chemical structure of the vanadium oxide 522, which meet the demands of the uncooling infrared or terahertz detectors.

The specific processes of the preferred embodiment mentioned above are as follows. (1) Prepare the thin film grown substrate as below. Select 4 inches Si (100) silicon wafer as the thin film grown substrate 1. Before the experiment, firstly treat the substrate at 80° C. by piranha solution (the volume ratio of concentrated sulfuric acid to hydrogen peroxide is equal to 7:3) for 10 minutes, and then clean the treated silicon wafer by deionized water, and then soak the cleaned silicon wafer by hydrofluoric acid (HF) solution with the concentration of 1.5:10 at the room temperature for 90 seconds, and lastly dry the soaked silicon wafer by high-purity nitrogen and immediately transfer the dried silicon wafer into the load-lock chamber of the PECVD system to vacuumize. (2) Grow the silicon nitride base film 510 as below. When the pressure of the load-lock chamber reaches $4 \times 10^{-2}$ Torr, move the Si(100) substrate 1 into the main vacuum chamber, heat the substrate to 300° C., once the temperature is stable, the RF power is turned on, the $SiH_4$ and $NH_3$ reaction gases are sent into the main vacuum chamber. The typical conditions of depositing the silicon nitride base film are that the RF frequency is 13.56 MHz, the power is 600 W, the flow ratio of $NH_3$ to $SiH_4$ is 200/250 sccm, the substrate temperature is 300° C., the deposition rate is about 0.8 nm/s, the deposition time is 250 seconds, the pressure of the main vacuum chamber while depositing is 0.6 Torr, the thickness of the silicon nitride base film is 200 nm. (3) Disperse the carbon nanotubes 521 as below. Put the prepared carbon nanotubes into the beaker, mix with the ethanol solvent and ultrasonically disperse. Move the dispersion liquid onto the surface of the clean substrate by the spin coating method, evaporate the ethanol solvent, thus forming the reticular interconnected carbon nanotube film 521. (4) Deposit the vanadium oxide film 522. Put the substrate 1 with the carbon nanotubes 521 dispersed on the surface thereof into the vacuum reactor, take the high-purity vanadium (V) as the target material, take high-purity argon (Ar) as the sputtering gas, and take high-purity oxygen ($O_2$) as the reaction gas to grow a layer of vanadium oxide film 522 with a thickness of 10-1500 nm at 200° C. by the DC reactive magnetron sputtering. The typical conditions of depositing the vanadium oxide are that the sputtering voltage is 350V, the power is 600 W, the percentage of oxygen in the gas mixture is 2%, the substrate temperature is 200° C., the deposition rate is about 10 nm/min, the deposition time is 10 minutes, the pressure of the main vacuum chamber while depositing is 1.1 Pa, the thickness of the vanadium oxide film is about 100 nm. Anneal to form the vanadium oxide-carbon nanotube composite film 520. (5) As required, repeat in turn the steps of dispersing the carbon nanotubes 521, depositing the vanadium oxide 522 and annealing to form the vanadium oxide-carbon nanotube multi-layer composite film structure 520. (6) Grow the silicon nitride top film 530 as below. Grow a layer of amorphous silicon nitride top film 530 with a thickness of 10-1500 nm on the surface of the vanadium oxide-carbon nanotube composite film 520 at 300° C. by PECVD, wherein $SiH_4$ and $NH_3$ act as the reaction gases. The typical conditions of depositing the silicon nitride top film by PECVD are that the RF frequency is 13.56 MHz, the power is 600 W, the flow ratio of $NH_3$ to $SiH_4$ is 200/250 sccm, the substrate temperature is 300° C., the deposition rate is about 0.8 nm/s, the deposition time is 250 seconds, the pressure of the main vacuum chamber while depositing is 0.6 Torr, the thickness of the silicon nitride top film is 200 nm. (7) After the step (6), cool the sample to the room temperature in the main vacuum chamber, and then take the sample out of the vacuum chamber, thus obtaining the three-layer sandwich structure 5 comprising the vanadium oxide-carbon nanotube composite film provided by the present invention, wherein the vanadium oxide-carbon nanotube composite film 520 is provided at the middle layer, two layers of amorphous silicon nitride film 530 and 510 are respectively provided above and below the vanadium oxide-carbon nanotube composite film.

In the present invention, the silicon wafer 1 can be cleaned by other solutions and methods which are known in the art besides Piranha and hydrofluoric acid solution. The film grown substrate can be the silicon chip having other crystalline phases and sizes, or made of other materials (select the proper cleaning process according to different substrates) besides Si(100) silicon wafer. The prepared carbon nanotubes are dispersed onto the substrate surface by the spin coating. Furthermore, the carbon nanotubes in the composite material can be induced to directly grow on the surface of the substrate by the chemical vapor deposition system at the growing temperature of 300-1100° C., wherein the reaction gas is selected from the group consisting of methane ($CH_4$), ethylene ($C_2H_4$), acetylene ($C_2H_2$) and benzene ($C_6H_6$), the catalyst is selected from the group consisting of Fe, Co and Ni, and other metals or alloys which are known in the art. In addition, as required, the carbon nanotubes in the composite material can be grown by other methods, such as the vacuum arc system and the laser ablation deposition system, besides the chemical vapor deposition system.

Figure 4:
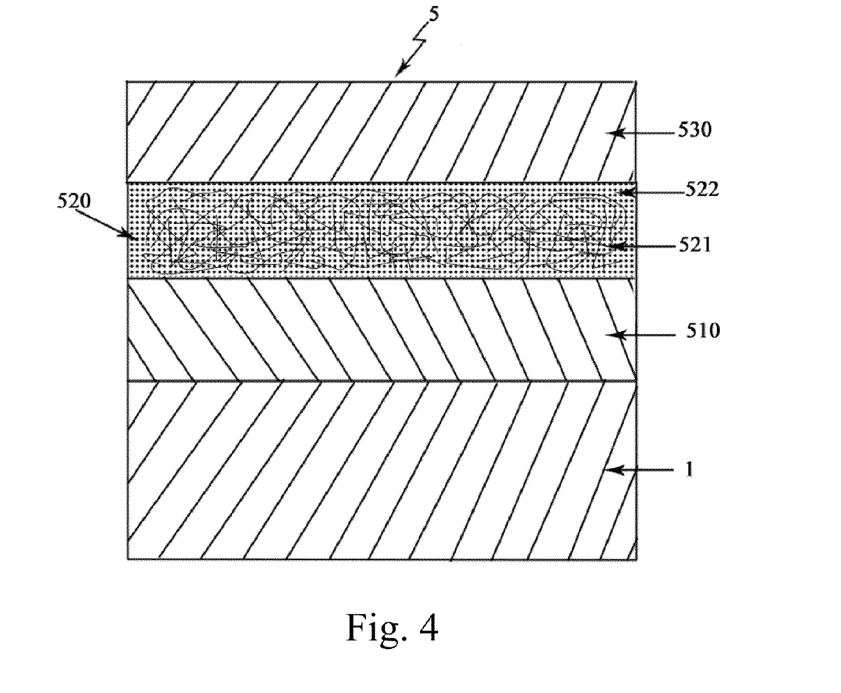
FIG. 4 is a sectional view of a three-layer sandwich structure comprising the silicon nitride base film, vanadium oxide-carbon nanotube composite middle film and silicon nitride top film of the present invention.

The lowest and highest layers 510 and 530 of the three-layer sandwich structure of the present invention can be selected from the group consisting of silicon oxide (SiOx) and silicon oxynitride (SiOxNy) film besides silicon nitride (SiNx).

Besides PECVD, the silicon nitride films 510 and 530 can be prepared by low pressure chemical vapor deposition (LPCVD), reduced pressure chemical vapor deposition (RPCVD), or ultra-high vacuum chemical vapor deposition (UHVCVD), electron beam evaporation (EBE), atomic layer deposition (ALD), magnetron sputtering (MS) which are known in the art. In the present invention, besides the DC reactive magnetron sputtering, the vanadium oxide 522 can be prepared by the RF reactive magnetron sputtering, or electron beam evaporation (EBE), atomic layer deposition (ALD), pulsed laser deposition, metal organic chemical vapor deposition (MOCVD) which are known in the art. While preparing the vanadium oxide film 522 by the magnetron sputtering, the target material can be vanadium oxides, or doping metal vanadium, doping vanadium oxides besides metal vanadium.

II. The Method for Manufacturing the Microbolometer Based on the Composite Material of the One-dimensional Carbon Nanotubes and Two-dimensional Vanadium Oxide Take the composite material of the one-dimensional carbon nanotubes and two-dimensional vanadium oxide provided by the preferred embodiment mentioned above as the thermistor and light absorbing material of the microbolometer for better controlling the electrical and optical properties of the material to avoid the change of the material property caused by the change of the chemical structures of the microbridge sensitive materials, thus improving the comprehensive performance of the device. The method for manufacturing the microbolometer based on the vanadium oxide-carbon nanotube composite film comprises the steps as follows. (1) Select the silicon wafer including the readout circuit (ROIC) as the substrate 1, clean, dry by nitrogen, put the dried silicon wafer into the PECVD system and deposit the amorphous silicon dioxide film as the passivation layer 2 with the thickness of 300-1500 nm. (2) Deposit a layer of metal aluminum with the thickness of 100-1000 nm on the surface of the silicon dioxide passivation layer by the magnetron sputtering system as the reflecting layer 3 of the micro-bridge 7. (3) Photolithograph the patterns of the bridge piers 730 of the suspended microbridge 7 on the surface of metal aluminum 3, etch the metal aluminum 3 to the silicon dioxide passivation layer 2, forming the micro-bridge pier holes and aluminum islands. (4) Coating a layer of photosensitive polyimide film 4 with the thickness of 1-4 μm in the spin manner on the surface of the metal aluminum 3. (5) Photolithograph the photosensitive polyimide film 4 to form the polyimide film islands and pier holes of the suspended micro-bridge, and then make the imine treatment. (6) Deposit a layer of amorphous silicon nitride 510 with the thickness of 10-1500 nm on the surface of the polyimide film islands and pier holes by PECVD at 300° C. as the supporting and to insulating materials of the suspended micro-bridge 7. Hereafter, according to the method for preparing the vanadium oxide-carbon nanotube composite film 520 mentioned in the I preferred embodiment of the present invention, firstly disperse the carbon nanotubes 521 on the surface of the silicon nitride film 510, and then deposit the vanadium oxide 522 by the reactor and anneal, thus forming the vanadium oxide-carbon nanotube composite film 520 with the thickness of 10-1500 nm as the heat sensitive and light absorbing material of the microbolometer. (7) After the step (6), deposit a layer of metal aluminum with the thickness of 10-500 nm by the reactor and image to act as the electrodes 6 of the device. (8) Lastly, deposit a layer of amorphous silicon nitride film 530 with the thickness of 10-1500 nm on the surfaces of the metal electrodes 6 and the vanadium oxide-carbon nanotube composite film 520 by the reactor as the passivation layer of the electrodes 6 and the sensitive film 520 and the control layer of the stress of the micro-bridge 7. (9) Photolithograph the pattern of the suspended micro-bridge 7 on the surface of the silicon nitride passivation layer 530, etch and pattern the vanadium oxide-carbon nanotube composite film 520 and the base silicon nitride film 510 to the polyimide layer 4, thus forming the bridge deck 710, the bridge legs 720 and the bridge piers 730. (10) Selectively remove the polyimide film 4 at the bottom of the pattern of the bridge deck 710 and the bridge legs 720 by oxygen plasma etching, thus forming the cavity 740 as the optical resonator of the device. Therefore, the microbolometer 8 based on the vanadium oxide-carbon nanotube composite film 520 is obtained.

In the present invention, the reflecting layer of the microbolometer 8 can be Ti, TiN, NiCr, WSi, Pt, Au and other optical reflecting layer which are known in the art besides metal Al.

The structure of the microbolometer based on the vanadium oxide-carbon nanotube composite film is shown in FIGS. 5, 6 and 7.

All in all, in the present invention, one-dimensional carbon nanotubes are introduced into two-dimensional vanadium oxide film, thus forming the composite material. The composite material effectively improves the electrical properties, optical properties and chemical stability of the vanadium oxide film, which meet the demands of the uncooling infrared and terahertz detectors. Compared with the conventional devices which only adopts the single-layer vanadium oxide film, or only adopts the carbon nanotubes as the infrared or terahertz heat sensitive material, the microbolometer based on the vanadium oxide-carbon nanotube composite film has some advantages as follows. (1) Use the excellent electrical and optical properties of the one-dimensional carbon nanotube and two-dimensional vanadium oxide to get the vanadium oxide-carbon nanotube composite film with excellent comprehensive performance, which meets the special demands of the uncooling infrared or terahertz detectors. (2) The quantitative regulation of the content ratio between the vanadium oxide and the carbon nanotube can lead to more easy and accurate control of the film stress in the device to meet the special demands of the micro-bridge structure of microbolometer. (3) Based on maintaining the excellent optical properties of vanadium oxide, the electrical properties of the composite film can be significantly improved. Simultaneously, the negative impacts of the traditional doping process on the chemical structure of vanadium oxide are avoided, which can not be achieved by the single vanadium oxide film. Therefore, in the present invention, taking the composite material of one-dimensional carbon nanotube and two-dimensional vanadium oxide as the thermistor material and the light absorbing material of the microbolometer can overcome the existing shortcomings of the prior art, decrease the difficulty of the process and improve the performance of the device.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A microbolometer, comprising a three-layer sandwich micro-bridge structure, wherein the micro-bridge structure comprising a first layer of amorphous silicon nitride film as a supporting and insulating layer, at least a layer of vanadium oxide-carbon nanotube composite film provided on the first layer of amorphous silicon nitride film as a heat sensitive and light absorbing layer, and a second layer of amorphous silicon nitride film provided on the layer of vanadium oxide-carbon nanotube composite film as a passivation and stress control layer, wherein the layer of vanadium oxide-carbon nanotube composite film, having a continuous two-dimensional film structure, is formed by one-dimensional carbon nanotubes and two-dimensional vanadium oxide film, wherein the two-dimensional vanadium oxide film is a main part and the one-dimensional carbon nanotubes is additives.

2. The microbolometer, as recited in claim 1, wherein the vanadium oxide-carbon nanotube composite film is prepared by steps of:
   (F1) cleaning the substrate, and drying the cleaned substrate;
   (F2) firstly putting a prepared carbon nanotubes into a beaker, mixing the carbon nanotubes with an organic solvent and ultrasonically dispersing, and then moving a dispersion liquid onto a surface of the cleaned substrate, evaporating the solvent, thus forming a reticular interconnected carbon nanotube film;
   (F3) putting the substrate with the dispersed carbon nanotubes into a vacuum reactor, growing a layer of vanadium oxide film, and annealing, thus forming the vanadium oxide-carbon nanotube composite film, wherein the grown vanadium oxide film is dispersed on the surfaces of the carbon nanotubes and at the gaps among the carbon nanotubes;
   (F4) cooling the sample to a room temperature, and then taking the sample out of the reactor; and
   (F5) as required, repeating the steps of dispersing the carbon nanotubes, depositing the vanadium oxide and annealing in turn, thus forming the multi-layer vanadium oxide-carbon nanotube composite film.

3. The microbolometer, as recited in claim 2, wherein in step (F2), the carbon nanotubes are dispersed by a method selected from the group consisting of spin coating, electrophoresis and printing transplantation, wherein during the spin coating, the dispersion liquid is selected from the group consisting of ethanol, isopropanol, isobutanol, isoamyl alcohol and isohexanol.

4. The microbolometer, as recited in claim 2, wherein the carbon nanotubes obtained in step (F2) are provided transversely on the surface of the substrate, have the reticular interconnected structure, are single-walled or multi-walled, have a diameter of 1-50 nm and a length of 50-30000 nm.

5. The microbolometer, as recited in claim 2, wherein in step (F2), the functional treatment of the carbon nanotubes is introducing —COOH, —COH, —CNH$_2$ functional groups by a method selected from the group consisting of a mixture of concentrated H$_2$SO$_4$ and HNO$_3$, concentrated nitric acid, potassium permanganate and Fenton method.

6. The microbolometer, as recited in claim 2, in the step (F3), the vanadium oxide can be prepared by a method selected from the group consisting of magnetron sputtering, electron beam evaporation, metal organic compound chemical vapor deposition and atomic layer deposition, wherein while using the magnetron sputtering, a target material can be metal vanadium, or VOx (wherein 1.0≤x≤2.5), a reaction gas is a mixture of argon and oxygen, wherein a percentage of oxygen in the mixture is 0.2-20%, a deposition temperature is 20-500° C.

7. The microbolometer, as recited in claim 1, wherein the vanadium oxide-carbon nanotube composite film is prepared by steps of:
   (F1) cleaning the substrate, and drying the cleaned substrate;
   (F2) directly growing a reticular interconnected carbon nanotube film, induced by metal catalyst, on a surface of the cleaned substrate using a chemical vapor deposition system, or an arc discharge system, a laser deposition reactor;
   (F3) putting the substrate with the grown carbon nanotubes obtained in step (F2) into a vacuum reactor, growing a layer of vanadium oxide film, and annealing, thus forming a vanadium oxide-carbon nanotube composite film, wherein the grown vanadium oxide is dispersed on the surfaces of the carbon nanotubes and the gaps among the carbon nanotubes;

(F4) cooling the sample to a room temperature, and then taking the sample out of the reactor; and (F5) as required, repeating the steps of growing the carbon nanotubes, depositing the vanadium oxide and annealing in turn, thus forming a multi-layer vanadium oxide-carbon nanotube composite film.

8. The microbolometer, as recited in claim 7, wherein in step (F2), when the chemical vapor deposition system acts as the reactor for growing the one-dimensional carbon nanotubes of the composite film, the reaction gas can be selected from the group consisting of methane, ethylene, acetylene and benzene, the catalyst is simultaneously selected from the group consisting of Fe, Co and Ni for inducing the carbon nanotube to directly grow on the surface of the substrate, a grow temperature of the carbon nanotube is 300° C-1100° C.

9. The microbolometer, as recited in claim 7, wherein the carbon nanotubes obtained in step (F2) are provided transversely on the surface of the substrate, have the reticular interconnected structure, are single-walled or multi-walled, have a diameter of 1-50 nm and a length of 50-30000 nm.

10. The microbolometer, as recited in claim 7, wherein in the step (F3), the vanadium oxide can be prepared by a method selected from the group consisting of magnetron sputtering, electron beam evaporation, metal organic compound chemical vapor deposition, and atomic layer deposition, wherein while using the magnetron sputtering, a target material can be metal vanadium, or VOx (wherein $1.0 \le x \le 2.5$), a reaction gas is a mixture of argon and oxygen, wherein a percentage of oxygen in the mixture is 0.2-20%, a deposition temperature is 20-500° C.

11. The microbolometer, as recited in claim 1, wherein the vanadium oxide-carbon nanotube composite film is prepared by steps of:

(F1) cleaning the substrate, and drying the cleaned substrate;

(F2) mixing vanadium oxide powder with an organic solvent, heating, removing insoluble matters by once or repeatedly centrifugal separation, extracting a supernatant fluid, and quietly placing, thus obtaining a vanadium oxide organic sol;

(F3) adding carbon nanotubes into the vanadium oxide organic sol obtained in step (F2), dispersing by ultrasound or stirring, thus forming the new sol mixing the vanadium oxide with the carbon nanotubes;

(F4) coating the new sol mixing the vanadium oxide with the carbon nanotubes obtained in step (F3) on the surface of the cleaned substrate in a spinning manner, and then annealing, thus forming the vanadium oxide-carbon nanotube composite film; and (F5) as required, repeating the steps of preparing the organic sol, mixing the vanadium oxide with the carbon nanotubes, coating the sol in the spinning manner and annealing in turn, thus forming the multi-layer vanadium oxide-carbon nanotube composite film.

12. The microbolometer, as recited in claim 11, wherein in step (F2), the solvent for preparing the vanadium oxide sol is a mixture of an organic solvent A and an organic solvent B, wherein the organic solvent A is benzyl alcohol, the organic solvent B is isopropyl alcohol, or isobutyl alcohol, isoamyl alcohol, isohexanol.

13. The microbolometer, as recited in claim 11, wherein in step (F3), the functional treatment of the carbon nanotubes is introducing —COOH, —COH, —CNH$_2$ functional groups by a method selected from the group consisting of a mixture of concentrated H$_2$SO$_4$ and HNO$_3$, concentrated nitric acid, potassium permanganate and Fenton method.

14. The microbolometer, as recited in claim 11, wherein in the step (F3), the added carbon nanotubes are the carbon nanotube solid substances without mixing with any solvents, or the carbon nanotube suspension liquid mixing with the organic solvent in advance.

* * * * *